United States Patent [19]
Edwards et al.

[11] Patent Number: 5,137,200
[45] Date of Patent: Aug. 11, 1992

[54] PORTABLE ULTRASONIC WELDING DEVICE

[75] Inventors: Richard E. Edwards, Long Beach; Donald R. Pottorff, Newbury Park, both of Calif.

[73] Assignee: Magnumsonics, Long Beach, Calif.

[21] Appl. No.: 720,230

[22] Filed: Jun. 25, 1991

Related U.S. Application Data

[63] Continuation of Ser. No. 542,834, Jun. 25, 1990, abandoned.

[51] Int. Cl.$^5$ .............................................. B23K 20/10
[52] U.S. Cl. .................................... 228/1.1; 228/44.7; 228/56.5
[58] Field of Search ...................... 228/1.1, 44.3, 110, 228/111, 44.7, 56.5

[56] References Cited

U.S. PATENT DOCUMENTS

| | | | |
|---|---|---|---|
| 3,602,421 | 8/1971 | Spratt, Jr. | 228/1.1 |
| 3,917,146 | 11/1975 | Culp | 228/1.1 |
| 4,782,990 | 11/1988 | Patrikios et al. | 228/1.1 |

Primary Examiner—Samuel M. Heinrich
Attorney, Agent, or Firm—Stetina and Brunda

[57] ABSTRACT

A portable ultrasonic welding device for performing ultrasonic welding upon large, awkward, or odd-shaped workpieces is disclosed. The portable ultrasonic welding device comprises a housing inside of which are disposed a transducer, a horn, an interchangeable anvil, and an air actuator. The air actuator urges the anvil toward the cone to capture the workpiece. Due to its compact size and portability, the portable ultrasonic welding device may be hand held in positions and orientations which provide welds that could not be obtained with prior art devices. This flexibility in positioning and orientation also helps eliminate weld voids by assuring maximum contact of the anvil with the workpiece.

5 Claims, 2 Drawing Sheets

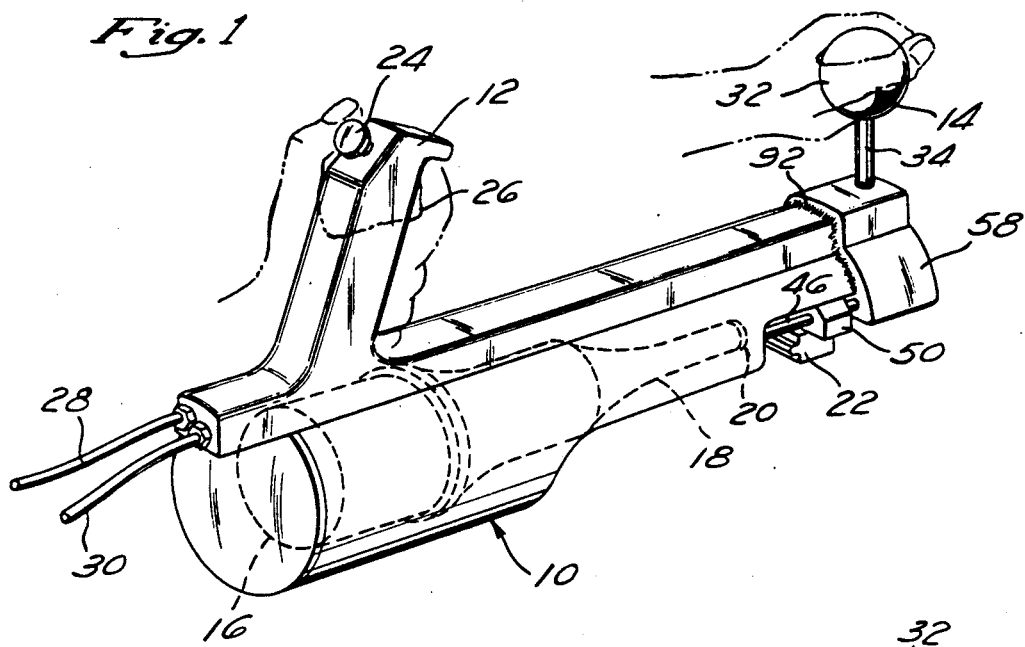
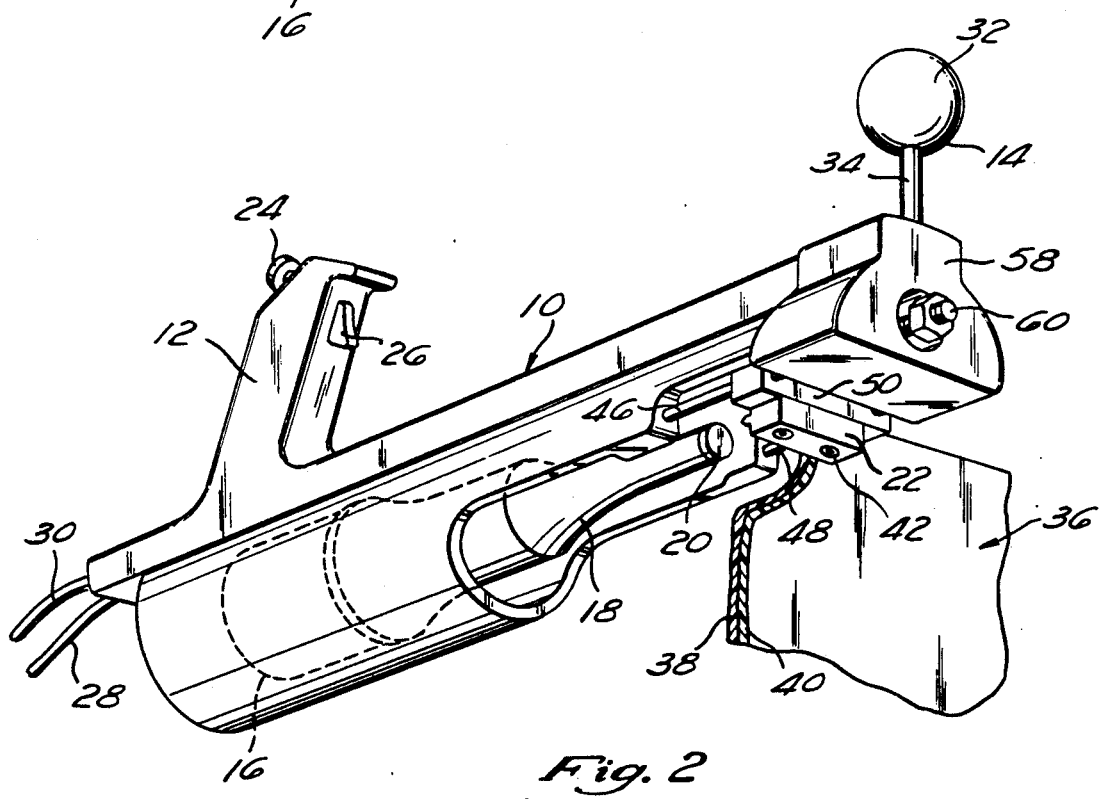

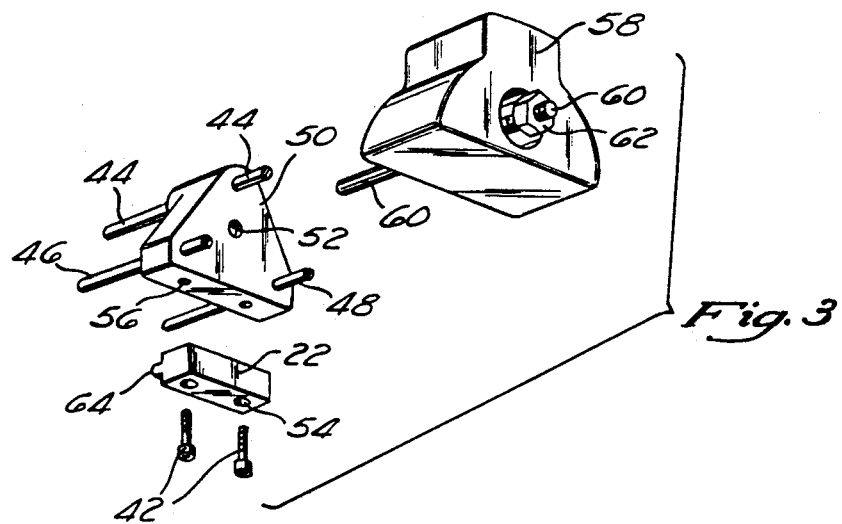
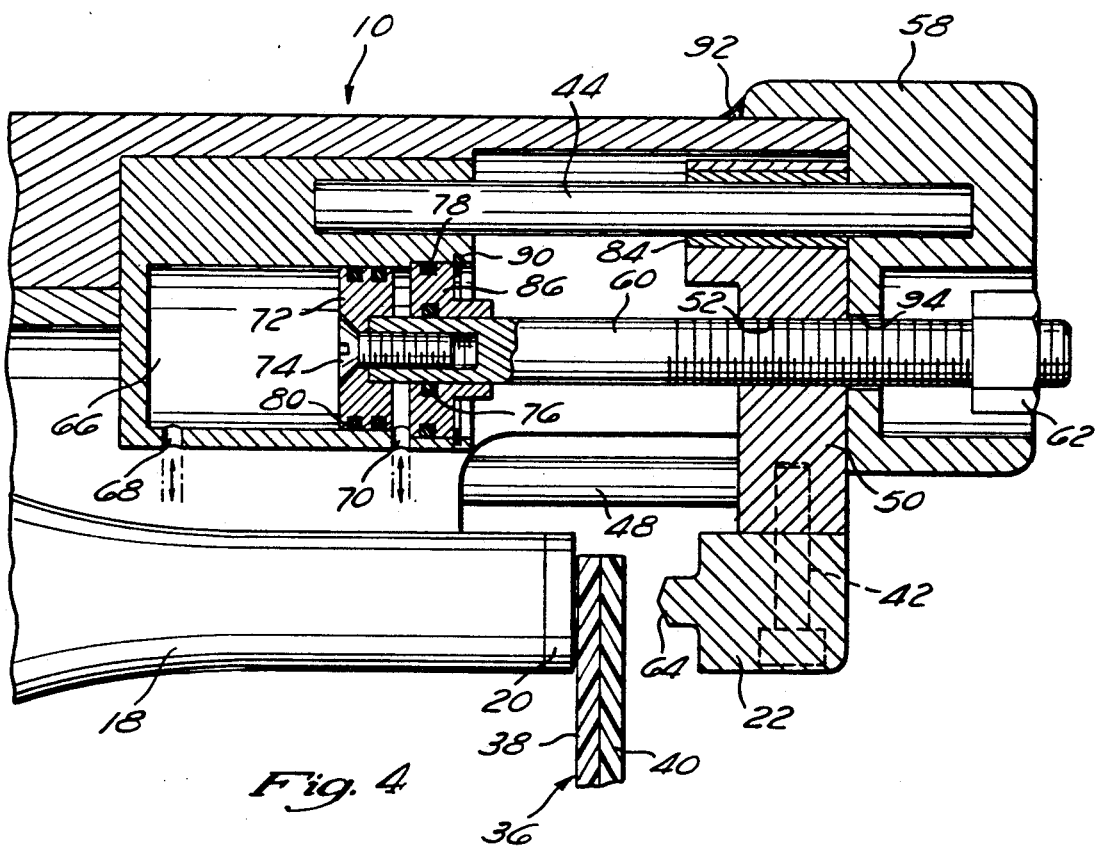

PORTABLE ULTRASONIC WELDING DEVICE

This application is a continuation of application Ser. No. 07/542,834, filed Jun. 25, 1990, now abandoned.

FIELD OF THE INVENTION

The present invention relates generally to ultrasonic welding devices and more particularly to a portable ultrasonic welding device for performing ultrasonic welding upon large, awkward, or odd-shaped workpieces.

BACKGROUND OF THE INVENTION

Ultrasonic welding devices for welding plastic polymers are well known. Such ultrasonic welders typically comprise a power supply, control electronics, ultrasonic transducer, horn, anvil, and mechanical actuating system mounted to a common frame and/or enclosed in a common housing.

The power supply provides electrical power to the ultrasonic transducer which converts the electric power into high frequency or ultrasonic mechanical vibration which is transferred through the horn to a workpiece. The workpiece is captured between the horn and an anvil to maximize the transfer of ultrasonic energy at the desired workpiece location. The ultrasonic energy transmitted mechanically from the transducer through the horn to the workpiece excites molecular motion within the workpiece, thereby increasing the temperature of the workpiece sufficiently to create a weld upon the workpiece between the horn and anvil.

Such ultrasonic welding apparatus are typically several feet tall and have a footprint of approximately two square feet. They commonly weigh in excess of one hundred pounds. Thus, such prior art ultrasonic welding apparatus cannot be easily moved from location to location or hand held and positioned upon a large workpiece for welding.

Alternative means of attaching plastic parts for large, awkward, or odd-shaped workpieces must be found when such workpieces cannot be accommodated by contemporary ultrasonic welding apparatus. Such alternative attachment means comprise rivets, chemical adhesives, and conventional fasteners such as screws, bolts, and nuts. Such alternative fastening means generally provide less than satisfactory results and are therefore undesirable. For example, mechanical fasteners such as rivets, screws, and nuts and bolts are subject to improper installation and failure. They are also considerably more expensive than ultrasonic welding. Chemical adhesives are subject to improper mix, poor installation, and failure during use. Chemical adhesives are difficult to apply and expensive, thus increasing assembly costs.

A common problem which occurs when attempts are made to use contemporary ultrasonic welding apparatus upon large, awkward or odd-shaped workpieces is the occurrence of weld voids. Weld voids occur when intimate contact of the workpiece is not achieved by the horn and anvil. While it is known in the art that the use of variously shaped anvils can reduce or eliminate weld voids, it is not always practical to change anvils many times when welding a particular workpiece.

Attempts to compensate for the use of an anvil having a less-than-ideal shape are made by striving to angle the workpiece in relation to the ultrasonic welding apparatus such that an adequate contact is achieved. To form a weld within a curved or bent portion of the workpiece, it is normally necessary to use an anvil having a corresponding curve. Rather than take the time to install the correct anvil, many operators attempt to orient the workpiece such that the anvil achieves adequate contact with the workpiece. For example, the length of the anvil could be aligned along the axis of the bend to provide maximum contact.

Minimum contact would be achieved by placing the anvil across the bend such that the anvil only contacts the workpiece at the ends of the anvil. This would result in the formation of a void during welding and should therefore be avoided. The ultrasonic welding of large, awkward, or odd-shaped workpieces makes it extremely difficult to optimize the angle and orientation of the workpiece, thereby requiring that the correct anvil be utilized.

Ultrasonic welding is typically limited to workpieces which can be hand held or mechanically positioned for welding. Thus, very large, awkward, or odd-shaped workpieces are typically unsuitable for ultrasonic welding using contemporary apparatus. Although such contemporary ultrasonic welding apparatus have proven generally suitable for their intended purpose, they possess inherent deficiencies which detract from their overall effectiveness in the marketplace.

In view of the shortcomings of the prior art, it is desirable to provide a portable ultrasonic welding device for performing ultrasonic welding upon large, awkward, or odd-shaped workpieces.

As such, although the prior art has recognized to a limited extent the problem of performing ultrasonic welding upon large, awkward, or odd-shaped workpieces, the proposed solutions have to date been ineffective in providing a satisfactory remedy.

SUMMARY OF THE INVENTION

The present invention specifically addresses and alleviates the above-mentioned deficiencies associated in the prior art. More particularly, the present invention comprises a portable ultrasonic welding device for performing ultrasonic welding upon large, awkward, or odd-shaped workpieces. The portable ultrasonic welding device comprises a housing inside of which are disposed an ultrasonic transducer, a horn, an interchangeable anvil, and an air actuator.

The air actuator urges the anvil toward the horn to capture the workpiece. A variety of variously shaped interchangeable anvils may be used to assure proper contact with the workpiece and thereby substantially eliminate weld voids. Due to its compact size and portability, the portable ultrasonic welding device may be hand held in positions and locations which provide welds that could not be obtained with prior art devices. Such welds are formed by maximizing contact of the horn and anvil with the workpiece, generally without necessitating that the horn be changed.

Since the portable ultrasonic welding device of the present invention can be hand held and manually angled and oriented upon the workpiece in order to optimize contact of the horn and anvil with the workpiece, the shape of the anvil is less important than in contemporary apparatus. That is, deficiencies in the shape of the anvil can more readily be accommodated by changing the position of the portable ultrasonic welder relative to the workpiece than can be accomplished in prior art devices. Thus, the necessity for constantly changing the anvil to accommodate particular contours in the work place is minimized.

Therefore, the portable ultrasonic welding device of the present invention provides a means for performing ultrasonic welding upon workpieces which either cannot be accommodated by contemporary non-portable ultrasonic welding apparatus or which would have excessive weld voids if welded with contemporary apparatus.

These as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a perspective view of the portable ultrasonic welding device of the present invention showing the transducer and horn in dash lines;

FIG. 2 is a perspective view of the portable ultrasonic welding device of FIG. 1 depicting its use upon a workpiece;

FIG. 3 is a perspective exploded view of the anvil, carrier, and housing end cap of the portable ultrasonic welding device of the present invention; and FIG. 4 is a cross-sectional side elevational view of a portion of the portable ultrasonic welding device of the present invention depicting the actuator mechanism, anvil, and a portion of the horn.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and sequence of steps for constructing and operating the invention in connection with the illustrated embodiment. It is understood, however, that the same or equivalent functions and sequences may be accomplished by different embodiments that are also intended to be encompassed within the spirit and scope of the invention.

The portable ultrasonic welding device of the present invention is illustrated in FIGS. 1-4 which depict a presently preferred embodiment of the invention.

Referring to FIGS. 1 and 2, the portable ultrasonic welding device is comprised of a generally cylindrical housing 10 having a first 12 and second 14 handle formed upon the upper surface thereof. Generally enclosed within the housing 10 are an ultrasonic transducer 16, a horn 18, and an anvil 22. The first handle 12 is formed on the rear of the housing 10 proximate the ultrasonic transducer 16 and the second handle is formed on the front at the housing proximate the anvil 22.

In the preferred embodiment of the present invention the generally cylindrical-shaped housing 10 and housing end cap 58 are formed of a light weight durable metal, such as aluminum, by methods well known in the art, i.e. casting and/or machining. The housing end cap 58 can be welded to the housing 10 by forming a weld 92.

The handle 12 is formed as an integral part of the generally cylindrical housing 10. The handle 14 is comprised of a spherical grip 32 and a post 34. The second handle 14 is attached to the housing end cap 58 by threading the post 34 into an aperture formed in the end cap 58. Thus, the second handle 14 is removably attached to the housing end cap 58. The second handle 14 may be removed from the portable ultrasonic welder of the present invention to facilitate welding in confined areas where the handle 14 would otherwise be in the way and thereby restrict usage.

While in the present invention a generally cylindrical housing 10 is utilized, those skilled in the art will recognize that various configurations of frames and chassis are likewise suitable and are equivalent to a housing for the purpose of the present invention.

The anvil 22 is mounted upon a carrier 50 which is adapted to reciprocate along first 44, second 46, and third 48 support rods (only first support rod 46 shown in FIGS. 1 and 2) in response to the activation of an air actuator (not shown). An air control button 24 controls the supply of air from an external source to the actuator to extend or retract the anvil 22.

In the extended position the anvil 22 is disposed at its maximum distance from the head 20 of the horn 18, thus providing clearance for the insertion of a workpiece. In its retracted position, the anvil 22 is disposed at its minimum distance from the head 20 of the horn 18, thus capturing the workpiece between the anvil 22 and the head 20.

The transducer switch trigger 26 controls the application of electrical power to the ultrasonic transducer 16 and therefore controls the duration of time during which ultrasonic energy is mechanically transmitted to the workpiece 36 and welding is thereby performed.

Power cord 28 communicates electrical power to the ultrasonic transducer 16 when the transducer switch trigger 26 is depressed. The air inlet tube 30 supplies pressurized air to the actuator via internal channels or conduits within the housing to extend or retract the anvil 22 as controlled by the air control button 24.

The air control button 24 controls a three-position valve 4 for retracting and extending the actuator. In the released or extended position, the air control button 24 does not apply air pressure to the actuator. In the fully depressed position, the air control button 24 applies air pressure to the actuator such that the anvil 22 retracts toward the horn 18 to capture a workpiece therebetween. In the intermediate position, the air control button 24 supplies air pressure to the actuator such that the anvil 22 extends away from the horn 18 to release the workpiece 36 captured therebetween.

The typical workpiece 36 comprises two layers 38 and 40 of a plastic polymer material, such as high density polyethylene. When inserted between the horn head 20 and the anvil 22, the two layers 38 and 40 of plastic material can be ultrasonically welded together in the region where ultrasonic energy is applied, i.e. between the head 20 and the anvil 22.

Referring now to FIGS. 3 and 4, the actuator and slide mechanism of the present invention are depicted. The actuator is comprised of a cylinder 66, a piston 72 disposed within the cylinder 66 and adapted to reciprocate therein. A connecting rod 60 is attached to the piston 72 by a flat head machine screw 74 and is threaded through an aperture 52 in the carrier 50. After passing through the carrier 50 the connecting rod 60 continues on through an aperture 94 in housing end cap 58. A nut 62 is threaded onto the end of the connecting rod 60 and adjustably sets the limit on the retraction stroke of the piston 72.

First 44, second 46, and third 48 support rods guide the carrier 50 in reciprocating motion longitudinally within the housing 10. The piston 72 reciprocates between its extended and retracted positions in response to air pressure controlled by the air control button 24 (FIGS. 1 and 2), thus causing like reciprocation of the carrier 50. A cylinder cap 86 secures the piston 72 within the cylinder 66 and provides an air-tight seal for retraction of the piston 72 within the cylinder 66. Seals 80 provide an air seal between the piston 72 and the cylinder 66 to prevent air leakage therebetween during retraction and extension of the piston 72. Seal 76 provides an air-tight seal between the cylinder cap 86 and the connecting rod 60. Seal 78 provides an air-tight seal between the cylinder cap 86 and the cylinder 66. Seals 76 and 78 thus prevent air leakage from the cylinder 66 during the retraction stroke. Snap ring 90 secures the cylinder cap 86 in place.

Extension air inlet 68 provides a means for supplying air to the cylinder 66 during the extension stroke. Retraction air inlet 70 provides a means for supplying air to the cylinder 66 during the retraction stroke.

Bushings 84 disposed within the carrier 50 provide a low-friction surface upon which the carrier 50 reciprocates along the first 44, second 46, and third 48 support rods.

As is common in the art, the drive cone 18 has a drive cone head 20 which forms a durable surface for contacting the workpiece 36. The anvil 22 has an anvil head 64 which contacts the workpiece 36 during ultrasonic welding. A variety of anvils can provide various shapes of anvil heads to accommodate various shapes of workpieces.

While it is crucial with contemporary ultrasonic welding apparatus to select an appropriate anvil, the requirement that an appropriate anvil be selected in the practice of the present invention is much less important. Contemporary ultrasonic welding devices require that an anvil having a shape which conforms to the contour of the workpiece be selected in order to avoid the formation of weld voids.

The ability of the user to position and orient the portable ultrasonic welding device of the present invention in a precisely desired manner reduces the requirement for precisely matching the anvil to the workpiece. That is, weld voids can often be avoided in the practice of the present invention by specifically orienting the portable ultrasonic welding device such that an efficient contact of the horn 18 and anvil 22 with the workpiece 36 is achieved. This reduces the need to constantly change the anvil 22 to match the specific contour of the workpiece for each individual weld. Thus, assembly time is greatly reduced and the quality of the welded product is substantially increased.

The ultrasonic welding device of the present invention must be connected to a conventional external power supply and power conditioning electronics which provide an excitation current to the ultrasonic transducer 16. Those skilled in the art will recognize that many contemporary configurations are suitable. The ultrasonic welding device of the present invention must also be connected to a source of pressurized air which is regulated to a pressure suitable for the actuator.

Having described the structure of the portable ultrasonic welding device of the present invention, a brief description of the operation may be helpful. The portable ultrasonic welding device is position upon the workpiece 36 such that the two layers 38 and 40 of the workpiece 36 will be captured between the anvil 22 and the head 20 of the horn 18 upon retracting the piston 72 within the cylinder 66.

After positioning the portable ultrasonic welding device upon the workpiece 36, the air control button 24 is depressed fully to supply air to the retraction port 70 of the cylinder 66 and thus retract the piston 72 within the cylinder 66. Retraction of the piston 72 within the cylinder 66 likewise retracts the connecting rod 60 and moves the carrier 50 toward the cylinder 66. The anvil 22 attached to the carrier 50 likewise travels toward the cylinder 66, thus capturing the workpiece 36 between the head 64 of the anvil 22 and the head 20 of the horn 18.

The ultrasonic welding device of the present invention is specifically positioned and oriented such that the head 20 of the cone 18 and the head 64 of the anvil 22 achieve maximum contact with the workpiece 36. This can be accomplished by rotating and positioning the portable ultrasonic welding apparatus to conform the head 64 of the anvil 22 to the contour of the workpiece 36. For example, if the workpiece has a slight bend or radius, then the portable ultrasonic welding device is oriented such that a straight anvil 22 tends to lie within the floor or lower-most portion of the bend, thus achieving maximum contact. That is, the head 64 of the anvil 22 is positioned to lie within the groove formed by an arch in the workpiece 36 instead of being positioned across the groove.

By positioning the head 64 of the anvil 22 within the groove formed by an arch in the workpiece 36, a substantial portion of the head 64 of the anvil 22 contacts the workpiece 36, whereas positioning the head 64 of the anvil 22 across a groove formed in a workpiece 36 would permit contact of the head 64 of the anvil 22 only along the end points of the head 64. Such positioning across a groove formed in the workpiece 36 would result in a weld void and therefore should be avoided. The portable ultrasonic welding device of the present invention makes the avoidance of such positioning more easily achieved than in prior art devices where intimate contact of the anvil 22 with the workpiece 36 is best achieved by providing a separate anvil 22 for each unique contour formed in the workpiece 36.

Having thus captured the workpiece 36, electrical energy is applied to the ultrasonic transducer 16 by depressing the transducer switch trigger 26. The duration for which ultrasonic energy is applied to the workpiece 36 is determined by the duration for which the transducer switch trigger 26 is depressed. Alternatively, the duration for which ultrasonic energy is applied to the workpiece 36 can be determined by a timer.

Releasing the transducer switch trigger 26 terminates the supply of electrical energy to the ultrasonic transducer 16 and thus terminates the ultrasonic welding process. Reducing pressure upon the air control button 24 permits the air control button 24 to extend to an intermediate position and causes pressurized air to be supplied to the extend port 68 of the cylinder 66, thus extending the piston 72 within the cylinder 66 and likewise extending the connecting rod 60. The carrier 50 attached to the connecting rod 60 travels away from the cylinder 66, thus causing the anvil 22 attached thereto to travel away from the workpiece 36. The portable ultrasonic welding device can then be repositioned where the next weld is required and the process repeated.

As can be seen from the above description of operation, the portable ultrasonic welding device of the present invention provides a convenient and practical means of welding large, awkward, or odd-shaped workpieces where the positioning of the workpiece within a contemporary ultrasonic welding device is either impossible or impractical. Flexibility in the positioning of the anvil relative to the workpiece reduces the occurrence of weld voids.

It is understood that the exemplary portable ultrasonic welding device described herein and shown in the drawings represents only a presently preferred embodiment of the invention. Indeed, various modifications and additions may be made to such embodiment without departing from the spirit and scope of the invention. For example, the shape and configuration of the housing, handles, and carrier need not be as illustrated and disclosed. It is recognized that other shapes and configurations may be suitable. Also, reciprocating motion of the carrier may be effected by means other than an air actuator. An electrical solenoid, for example, may be suitable. Additionally, it is recognized that while the present invention discloses an anvil 22 which is adapted for reciprocating motion relative to a horn 18, it would be equivalent to adapt the horn 18 for reciprocal motion relative to anvil 22. That is, the actuator could be adapted to effect motion of the horn 18 instead of the anvil 22. Thus, these and other modifications and additions may be obvious to those skilled in the art and may be implemented to adapt the present invention for use in a variety of different applications.

What is claimed is:

1. A portable ultrasonic welding device comprising:
   (a) an elongate housing adapted to be hand held;
   (b) an ultrasonic transducer supported by said housing, said ultrasonic transducer having a horn attached thereto, said horn having a head formed thereon;
   (c) an anvil positionable in opposition to said head;
   (d) an actuator attached to said housing, for moving said anvil in reciprocating linear motion toward and away from said head;
   (e) first and second handles formed along the upper surface of said housing such that the portable ultrasonic welding device may be grasped above its center-of-gravity;
   (f) an adjustable stop to selectively limit the reciprocating motion of said anvil and said horn relative each other;
   (g) wherein the reciprocating linear motion of said anvil mitigates the development of shear stress in the workpiece;
   (h) wherein grasping the portable ultrasonic welding device above its center of gravity provides a more stable hold on the device than would grasping the device below its center-of-gravity.

2. The portable ultrasonic welding device as recited in claim 1 further comprising:
   (a) a plurality of support rods attached to said housing such that their longitudinal axes are parallel to the longitudinal axis of said housing;
   (b) a threaded connecting rod attached to said actuator and threaded through said carrier, said carrier slidably receiving said plurality of support rods and adapted to travel therealong such that said carrier is substantially limited to reciprocating linear motion toward and away from said head;
   (c) wherein the maximum gap between said anvil and said head can be adjusted by rotating said threaded connecting rod relative to said carrier.

3. The portable ultrasonic welding device as recited in claim 2 wherein said second handle is formed forward of the head to provide enhanced control of the positioning of said anvil and said head and said second handle is substantially spherical in shape to permit it to be grasped from a variety of different directions.

4. The portable ultrasonic welding device as recited in claim 3 further comprising:
   (a) an air control button disposed upon said first handle configured to be actuated by depression of a user's thumb for controlling said actuator; and
   (b) a transducer switch trigger disposed upon said first handle configured to be actuated by the depression of a user's finger for controlling said transducer.

5. The portable ultrasonic welding device as recited in claim 4 wherein said adjustable stop comprises:
   (a) said threaded connecting rod attached to said actuator;
   (b) a nut threaded onto said connecting rod; and
   (c) wherein adjustment of said not provides a repeatable and precise limit on the reciprocating motion of said anvil and said horn relative to each other.

* * * * *